United States Patent
Tune (10) Patent No.: US 10,740,269 B2
(45) Date of Patent: Aug. 11, 2020

(54) ARBITRATION CIRCUITRY

(71) Applicant: Arm Limited, Cambridge (GB)

(72) Inventor: Andrew David Tune, Dronfield (GB)

(73) Assignee: ARM Limited, Cambridge (GB)

( * ) Notice: Subject to any disclaimer, the term of this patent is extended or adjusted under 35 U.S.C. 154(b) by 5 days.

(21) Appl. No.: 16/037,117

(22) Filed: Jul. 17, 2018

(65) Prior Publication Data

US 2020/0026674 A1   Jan. 23, 2020

(51) Int. Cl.
*G06F 12/00* (2006.01)
*G06F 13/366* (2006.01)
*G06F 9/50* (2006.01)

(52) U.S. Cl.
CPC .......... *G06F 13/366* (2013.01); *G06F 9/5011* (2013.01)

(58) Field of Classification Search
CPC ....... G06F 13/00; G06F 13/366; G06F 9/5011
USPC .......... 710/240–244, 117, 124, 111, 113, 41, 710/107, 305–306
See application file for complete search history.

(56) References Cited

U.S. PATENT DOCUMENTS

| | | | | |
|---|---|---|---|---|
| 6,708,267 B1* | 3/2004 | Flacks | .................. | G06F 9/3838 712/216 |
| 6,883,132 B1* | 4/2005 | Dotson | ................. | H03M 13/09 714/774 |
| 2003/0156597 A1* | 8/2003 | Eberle | ............... | H04L 12/40019 370/447 |
| 2013/0054856 A1* | 2/2013 | Lim | ........................ | G06F 13/14 710/242 |

* cited by examiner

*Primary Examiner* — Tim T Vo
*Assistant Examiner* — Kim T Huynh
(74) *Attorney, Agent, or Firm* — Nixon & Vanderhye P.C.

(57) ABSTRACT

Arbitration circuitry is provided for allocating up to M resources to N requesters, where M≥2. The arbitration circuitry comprises group allocation circuitry to control a group allocation in which the N requesters are allocated to M groups of requesters, with each requester allocated to one of the groups; and M arbiters each corresponding to a respective one of the M groups. Each arbiter selects a winning requester from the corresponding group, which is to be allocated a corresponding resource of the M resources. In response to a given requester being selected as the winning requester by the arbiter for a given group, the group allocation is changed so that in a subsequent arbitration cycle the given requester is in a different group to the given group.

18 Claims, 9 Drawing Sheets

ARBITRATION CIRCUITRY

BACKGROUND

Technical Field

The present technique relates to the field of integrated circuits. More particularly, it relates to arbitration circuitry.

Technical Background

A computing system or integrated circuit may include at least one point at which there are a certain maximum number M of resources available for allocation to requesters and a certain maximum number N of requesters which may request allocation of a resource in a given arbitration cycle. In cases where the maximum number of resources N is greater than or equal to 2, there can be a design challenge in guaranteeing that any request is allocated to at most one resource.

SUMMARY

At least some examples provide arbitration circuitry for allocating resources to requesters, where a maximum number of resources that can be allocated to requesters in a given arbitration cycle is M, a maximum number of requesters requesting allocation of a resource in the given arbitration cycle is N, and M≥2; the arbitration circuitry comprising: group allocation circuitry to control a group allocation in which the N requesters are allocated to M groups of requesters, with each requester allocated to one of the groups; M arbiters each corresponding to a respective one of the M groups, each arbiter to select one requester from the corresponding group as a winning requester to be allocated a corresponding resource of the M resources; in which: in response to a given requester being selected as the winning requester by the arbiter corresponding to a given group, the group allocation circuitry is configured to change the group allocation so that in a subsequent arbitration cycle the given requester is in a different group to the given group.

At least some examples provide arbitration circuitry for allocating resources to requesters, where a maximum number of resources that can be allocated in a given arbitration cycle is M, a maximum number of requesters that can request allocation of a resource in the given arbitration cycle is N, and M≥2; the arbitration circuitry comprising: means for controlling a group allocation in which the N requesters are allocated to M groups of requesters, with each requester allocated to one of the groups; M means for arbitration each corresponding to a respective one of the M groups, each means for arbitration to select one requester from the corresponding group as a winning requester to be allocated a corresponding resource of the M resources; in which: in response to a given requester being selected as the winning requester by the arbiter corresponding to a given group, the means for controlling is configured to change the group allocation so that in a subsequent arbitration cycle the given requester is in a different group to the given group.

At least some examples provide an arbitration method for allocating resources to requesters, where a maximum number of resources that can be allocated in a given arbitration cycle is M, a maximum number of requesters that can request allocation of a resource in the given arbitration cycle is N, and M≥2; the method comprising: allocating N requesters to M groups of requesters, with each requester allocated to one of the groups; performing arbitration using M arbiters each corresponding to a respective one of the M groups, each arbiter to select one requester from the corresponding group as a winning requester to be allocated a corresponding resource of the M resources; and in response to a given requester being selected as the winning requester by the arbiter corresponding to a given group, changing the group allocation so that in a subsequent arbitration cycle the given requester is in a different group to the given group.

Further aspects, features and advantages of the present technique will be apparent from the following description of examples, which is to be read in conjunction with the accompanying drawings.

DESCRIPTION OF EXAMPLES

Arbitration circuitry is provided for allocating resources to requesters, where a maximum number of resources that can be allocated to requesters in a given arbitration cycle is M, and a maximum number of requesters requesting allocation of a resource in the given arbitration cycle is N, where M is greater than or equal to 2. The arbitration circuitry comprises group allocation circuitry to control a group allocation in which the N requesters are allocated to M groups of requesters, with each requester allocated to one of the groups. M arbiters are provided, each corresponding to a respective one of the groups. Each arbiter may select one requester from the corresponding group as a winning requester to be allocated a corresponding resource of the M resources. In response to a given request being selected as the winning requester by the arbiter corresponding to the given group, the group allocation circuitry may change the group allocation so that in a subsequent arbitration cycle the given requester is in a different group to the given group.

Hence, as the group allocation circuitry pre-allocates each of the N requesters into one of the M groups, each of the M arbiters can simply select one winning requester from its corresponding group without needing to include logic for conflict resolution to ensure that a given requester is only allocated one resource. This means the critical timing path through the arbiter is relatively low since each of the M arbiters can be a simple N:1 arbiter which selects the winning requester from up to N inputs. As the group allocation circuitry changes which group a given requester is allocated to when the given requester is selected as a winning requester by one of the arbiters, this can improve performance because as the group membership changes over time, this means that even if one particular requester tends to block other requesters from being allocated resources, which particular requesters are blocked by the first requester will vary from time to time, avoiding imbalance in allocation of resources to requests or a skew in the group allocations.

Also, since the switch of a given requester from a given group to a different group occurs when that given requester is selected as the winning requester in a given arbitration cycle, and the transfer of the given request to the different group then takes effect for a subsequent arbitration cycle, this means that the group allocation circuitry for controlling the group allocation can be off the critical timing path of the arbitration circuitry. Hence, unlike comparative approaches, the logic for conflict resolution to avoid a given requester being allocated to more than one resource can be provided of the critical timing path and functions in an earlier cycle than the given arbitration cycle in which the result of that conflict resolution is used. This can provide better timing performance and permit the arbitration circuitry to operate at higher frequencies.

Each arbiter may comprise an N:1 arbiter configured to select the winning requester from among enabled request signals on N input lines to the arbiter, where each input line corresponds to one of the N requesters. For a given arbiter, the group allocation circuitry may disable request signals on any of the N input lines which correspond to requests not allocated to the group corresponding to the given arbiter. Hence, although each of the N arbiters may be capable of selecting the winning requester from a maximum of N requesters enabled on the N input lines if all of the requesters are allocated to the same group, in practice often different requesters may be allocated to different groups and so a given arbiter may actually select the winning requester from among fewer than N requesters which are members of the corresponding group for that arbiter. Also, sometimes not all requesters may be making a request for resources in a given arbitration cycle and so some of the N requesters may be disabled regardless of their group membership. That is, when a particular requester is not currently making a request then the corresponding input line to each of the M arbiters may be disabled regardless of the group membership. Hence, the input lines to a given arbiter could be disabled either as a result of the requester being disabled and not making a request at all, or when the requester is making a request, because that requester has not been allocated to the group corresponding to the given arbiter.

Similarly, although the arbitration circuitry is capable of allocating a maximum of M resources per cycle, it is not essential for all of those resources to be available for allocation in every arbitration cycle. In some arbitration cycles a given resource may be busy servicing an earlier winning request and so that resource may not be available for allocation. Hence, although the arbitration circuitry is capable of granting access up to a maximum of M resources per cycle, in some cycles some resources may not be available and in this case some groups of requesters may not be allowed to be allocated a resource in a particular cycle.

In response to the given request of being selected as the winning requester, the group allocation circuitry may change the group allocation to switch the given requester to a next group in a predetermined sequence of groups. Hence, as a given requester is selected as the winning request over successive arbitration cycles, each time that requester is selected it may be switched to the next group in the predetermined sequence, so that the requester effectively cycles through the groups in a particular order.

In some implementations, the switching of the given requester to the next group in the predetermined sequence may be independent of whether a particular resource is busy or available, so that even if the resource which corresponds to the next group in the sequence is busy then the given requester is still switched to the next group in the sequence.

However, in other examples the group allocation may also consider which resources are busy. When, at the time when a winning request is to be switched to the next group, it is determined that a resource corresponding to the next group in the predetermined sequence is busy or will be busy in the next cycle, the group allocation circuitry may skip the next group in the sequence and instead switch the given requester to a subsequent group in the predetermined sequence. In some implementations the group allocation circuitry may only be capable of skipping one group in the predetermined sequence when that group corresponds to a busy resource. Alternatively, more complex implementations may be able to skip multiple groups if each of the corresponding resources is busy. By skipping groups corresponding to busy resources, this reduces the chance that when one particular resource is busy for a significant amount of time, a large fraction of the requesters all end up allocated to that resource's group. If the majority of the requesters end up in the busy resource's group, this could reduce throughput of requesters being allocated resources, as it may mean other groups being empty of requesters and so some resources which are available may not be allocated to any requesters. In contrast, performance can be improved by considering which resources are busy so that it is less likely that requesters accumulate in the group for which the resource is busy.

In some examples, each of the requesters may use the same predetermined sequence, with the order of the groups being the same in the sequence for each requester.

However, in other examples, an order of the groups in the predetermined sequence may be different for different requesters. This can further improve performance because, if a group corresponding to a busy resource is skipped in the sequence and each of the requesters uses the same sequence of groups, then this could result in a large fraction of the requesters or being allocated to the next group after a busy resource, which can again reduce throughput of grant of resources to requesters. In contrast, by providing different requesters with a different order of the sequence of the groups, this means that the group which follows a busy resource's group may be different for different requesters. By increasing the chance that the requesters are distributed relatively evenly across the groups, this reduces the chance of a particular group not including any of the N requesters, to improve throughput.

The group allocation circuitry may comprise N counters, each counter corresponding to one of the N requesters. Each counter may cycle through a sequence of M count values, where each of the M count values corresponds to one of the groups. The group allocation circuitry may select the group allocated to a given requester based on a current count value of the counter corresponding to the given requester. Hence, when a given requester is selected as the winning requester by one of the M arbiters, the corresponding counter for that requester may be triggered to update its count value to switch to the next count value of its sequence. This means the given requester will be allocated to a different group in the next cycle of arbitration.

At a reset event or on initialisation of the arbitration circuitry, the N counters may be reset to a variety of different count values in the sequence, so that in an initial cycle of arbitration following the reset event or initialisation event, the N requesters are distributed among different groups. By preventing all of the requesters initially being in the same group, this can improve throughput, avoiding some groups being empty of requesters for an initial period following the reset event. In some examples, in response to the reset or initialisation event, a group allocation may be selected which ensures that each group includes at least one requester. However, this is not essential. In practice, even if all requesters are allocated to the same group, the group allocations tend to settle to a useful de-synchronisation (with spread of requesters across groups) relatively quickly as requesters are selected as winning requesters and transferred to other groups. Therefore, in some cases it may be simpler to initialise each counter to an arbitrary value or fixed value, permitting some groups to not include any requesters in the first arbitration cycle following initialisation or reset.

The N counters can be implemented as any storage element which cycles through its sequence of M count values fairly. It is not necessary that the counters are linearly incremented. For example a fast counting structure such as a linear feedback shift register (LFSR) can be used.

In one example, each counter may comprise a one-hot shift register. A one-hot shift register comprises a number of bits, only one of which is set to 1 at any given time, with all of the other bits set to 0. When a given requester is granted access to a resource as the winning requester, its corresponding counter may have the '1' bit shifted to a different bit position within the one-hot shift register. This approach can be particularly beneficial because each bit of the one-hot shift register can simply be used directly as the enable input for controlling group membership, which avoids complex wiring and provides a smaller delay from the N counters to the critical decision logic of the arbiter.

In a particular implementation, each one-hot shift register may comprise a distributed shift register which comprises a number of bits distributed among the M arbiters, with each arbiter being associated with one bit from each of the N one-hot shift registers which correspond to the N requesters. Hence, each arbiter may have one bit from each of the N one-hot shift registers positioned locally to that arbiter on the integrated circuit. A given one-hot shift register may have its bits distributed among the M arbiters, so that the bits within the same one-hot shift register are positioned further apart on the integrated circuit than the collection of bits from different one-hot shift registers which correspond to the same arbiter. This approach can help to reduce the path length of the wiring linking the respective bits of the one hot-shift registers to the corresponding enable logic for the arbiters. This helps to reduce circuit area.

In one example, the plurality of bits of a given distributed shift register may be connected in a folded torus topology. A folded torus topology may be a network topology comprising a number of nodes connected in sequence so that each node outputs a signal to the next node in the sequence and each node appears once in the sequence (so that when the signal has passed through each node in the sequence then it reaches the original node once more so that effectively the nodes are connected in a ring). However the ring is folded so that at least some nodes in the sequence output their signal to a node other than its nearest neighbour. For example, each link in the network could skip the nearest neighbour node and connect to the next nearest neighbour instead, effectively skipping out some nodes in the sequence. The omitted nodes can instead be traversed on a reverse crossing of the network when signals return in the opposite direction. While this approach may increase the path length between a pair of directly connected nodes in some parts of the network, this approach helps to reduce the maximum path length between a pair of connected nodes, by eliminating a need for a very long wire wrapping back from the last of the nodes of the sequence to the first node, which would otherwise be needed in a non-folded topology. Hence, by using a folded torus topology for connecting the individual bits for a given distributed shift register, this can avoid needing to provide very long wire lengths in the integrated circuit which can make the integrated circuit design less complex and enable higher frequency operation.

In some implementations, when a given group of requesters includes more than one of the N requesters, the corresponding one of the M arbiters could simply select the winning requester as an arbitrary choice from the corresponding group of requesters, without consulting any other information. However, other implementations may consult selection state information in order to decide which of the group of requesters should be selected as the winning requester. For example the selection state information could indicate a relative priority of the N requesters, so that a higher priority requester can be granted access to resources more frequently than a lower priority requester. In another example, the selection state information could include information on which of the N requesters has least recently been selected as the winning requester by any of the M arbiters, so that a quality of service scheme could be used to reduce the likelihood that a request is starved of resource. Some examples may use multiple different types of selection state information for determining which of the corresponding group of requesters should be selected as the winning requester by the arbiter.

As each of the M arbiters selects its winning requester from a corresponding group of requesters, and different groups include different subsets of requesters, one may expect that a separate storage region would need to be provided for each of the M groups of requesters, to record the selection state information for the corresponding group of requesters excluding state information for requesters not in that group. However, in practice, as the requesters which are not allocated to a particular group will have their request signals disabled on the input lines to the arbiter for that group disabled as discussed above, it does not matter if the selection state information for one of those disabled requesters is still provided to the corresponding arbiter for the group of which that disabled requester is not a member, because even if the selection state information indicates that the disabled requester which is not a member of the corresponding group is the highest priority requester for example, the arbiter will still not select that requester and would instead select the winning requester from among the enabled requesters which are a member of the corresponding group and are currently making a request in the current cycle of arbitration.

Therefore, a shared storage element can be provided to store the selection state information associated with each of the N requesters. Each of the M arbiters may be configured to select the winning requester from among the corresponding group of requesters based on the selection state information based in the shared storage element. Hence, since the same request never targets more than one of the M arbiters, these arbiters can share the state information which stores the relative priorities of each pair of inputs or indicates other types of selection state information. By avoiding the need to provide specific selection state storage elements for each of the M arbiters, this can provide an area and power saving.

In some implementations N may be greater than M, so that the maximum number of requesters (N) which can request allocation of resource in a given cycle is greater than the maximum number of resources (M) available for allocation in a given arbitration cycle. However, the arbitration cycle of the type discussed above can also be used in cases where N is equal to M, or even if M is greater than N, since even if there are some arbitration cycles where there are sufficient numbers of resources available to grant a resource to every requester, there may be other cycles when some resources may be busy or unavailable and so there may still be a need to select a subset of the requesters which can be allocated access to a given resource. The arbitration circuitry of the type discussed above can be useful in determining which of the N requesters can be allocated access to resources in such arbitration cycles where there are insufficient resources to grant each request a resource.

An integrated circuit may be provided comprising the arbitration circuitry as discussed above. The arbitration circuitry can be used at any point of the integrated circuit at which there is contention for resources among requesters. In one example the M resources may comprise two or more execution units capable of executing the same type of instruction, and the N requesters may comprise N instructions capable of being executed by any of the M execution units. For example, a processing element in an integrated circuit may include multiple execution units of the same type, such as multiple integer ALUs or multiple floating point computation units. In cycles when there are more instructions capable of being processed by the execution units than there are the number of execution units available for executing those instructions in a given processing cycle, the arbitration circuitry of the type discussed above can be used to select which instructions can be executed in the current cycle.

In another example the resources may comprise buses for routing signals across the integrated circuit, and the requesters may comprise requests for bandwidth to be allocated of any of the buses. If a number of requesters requesting bus access is greater than the number of slots on a bus available for allocating in a given arbitration cycle, then the arbitration circuitry of the type discussed above may select which requesters may be allocated bandwidth in the buses.

Other examples of resources which could be arbitrated based on the arbitration circuitry discussed above could include storage slots in a tracking structure time slots in which a particular hardware resource or processing element is allocated to a given requester, etc.

Figure 1:
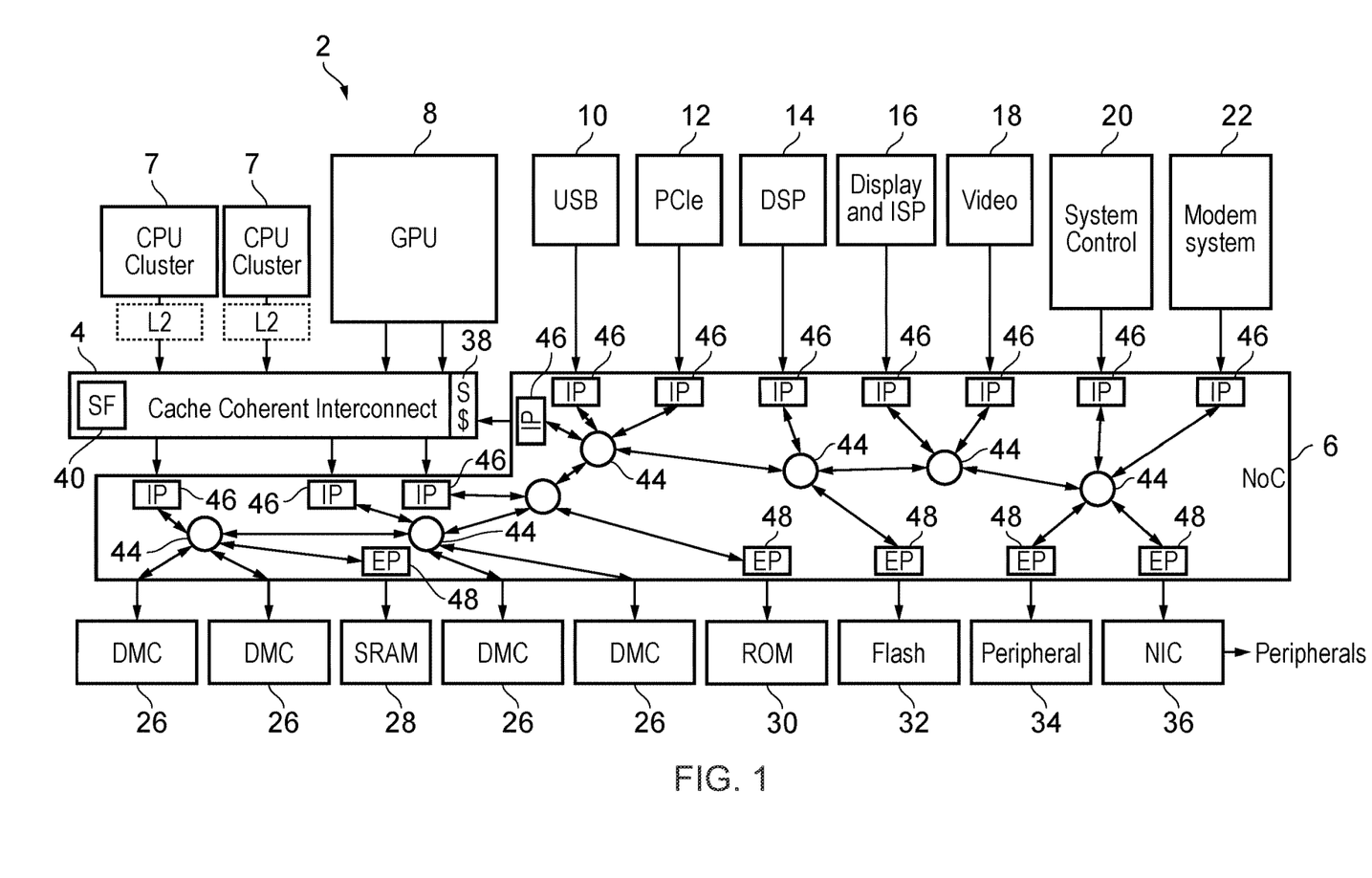
FIG. 1 schematically illustrates an example of an integrated circuit.

FIG. 1 schematically illustrates an example of a data processing system 2 (e.g. an integrated circuit or system-on-chip) having data access routing circuitry 4, 6 for routing data access requests between requesting nodes and destination nodes and routing the responses to such data access requests from the destination nodes to the requesting nodes. In this example the system 2 includes a number of master devices, such as: one or more central processing units (CPUs) 7 or clusters of CPUs; a graphics processing unit (GPU) 8; a USB master 10 for controlling interaction with devices over a universal serial bus (USB); a PCIe controller 12 for controlling interaction with devices connected to the system 2 over a PCI Express bus; a digital signal processor (DSP) 14; a display controller and/or image signal processor 16; a video controller 18; a system controller 20, which could provide a number of system control functions such as controlling direct memory access operations, controlling security operations such as encryption or other on chip security operations, or controlling interaction with peripherals; and a modem system controller 22 for controlling communications via a modem. All of the masters 7 to 22 may be capable of acting as a requesting node for issuing data access requests to be serviced by a destination node of the system.

The system may have a number of components which may act as destination nodes, for example including a number of memory controllers 26 for controlling access to dynamic random access memory (DRAM); a memory controller 28 for controlling access to static random access memory (SRAM); a memory controller 30 for controlling access to a read only memory (ROM); a flash memory controller 32 for controlling access to flash memory; a peripheral controller 34 for controlling access to peripheral devices; and a network interface controller 36 for controlling interaction with remote devices or further peripherals via a network interface. Also the destination nodes may include a system cache 38 within the data routing circuitry 4, 6, which can cache some data from the memory system 26-36 so that some data access requests can be serviced without needing to pass them on to a downstream memory component.

In the example of FIG. 1, some of the masters 7, 8 are coupled via a cache coherent interconnect 4 which is responsible for managing coherency between cached data held by the respective master's caches. The cache coherent interconnect may have a snoop filter 40 for tracking data cached in particular masters' caches and may respond to read and write data access requests specifying a target address by issuing snoop transactions to check for the coherency status of data associated with the target address cached in other masters, so that if one master requests read or write access to data, then data for the same address in another master's cache can be invalidated, or if dirty, the latest value in that other master's cache can be provided to the requesting master and/or written back to the memory system. Any known coherency protocol could be used for the cache coherent interconnect 4.

The other masters 10 to 22 (which may not comprise a cache) do not need to be connected via the cache coherent interconnect 4. A system interconnect 6 couples the outputs of the cache coherent interconnect 4 and the non-cached masters 10 to 22 with the respective destination devices 26 to 36. The system interconnect 6 is used for routing of transactions to a target destination node selected based on the target address specified by the request, and for routing of the responses back to the requesting node. In the arrangement shown in FIG. 1, the system interconnect 6 does not need to take responsibility for management of coherency between cache data in respective masters. However, in other examples, instead of providing a separate cache coherent interconnect 4 and system interconnect 6 as shown in FIG. 1, a single interconnect similar to the system interconnect 6 could be provided which connects each of the master and slave devices and also manages cache coherency.

In this example, the system interconnect 6 is implemented as a network on chip (NoC) which comprises a number of routers 44 for coupling a number of master interfaces 46 (from which data access requests, including read and write requests, can be received from respective master devices 7-22) to a number of destination interfaces 48 (for outputting the requests to respective destination devices 26-36). Each master interface 46 (also known as an ingress port, IP, or source endpoint) is responsible for decoding the address specified by the data access request to identify the particular route to be taken through the network on chip 6 via the routers 44 to reach a destination interface 48 associated with the selected destination node which is to service the data access request. In some cases the master interface 46 may also translate the protocol used for the request asserted to the network on chip 6 into an internal representation to be used for routing the request across the network on chip 6. If the requests are translated into an internal protocol, then the destination interfaces 48 (also known as egress ports, EP, or destination endpoints) may translate them back into the original protocol used by the request in order for servicing by the destination. Alternatively, some of the destination nodes may handle the request directly in the form used by the network on chip 6 so that no translation would be needed at the destination interface. For each destination interface 48, when it receives the response to a data access request from the destination node 26-36, the destination interface 48 issues that response back along the path taken by the corresponding request to the master interface 46 which issued the request, and the master interface 46 then returns the response to the requesting node.

A network on chip 6 as shown in FIG. 1 can be useful when there are a large number of master and destination devices to be connected, as the arrangement of routers 44 can be designed bespoke for the requirements of a given system in order to provide for an appropriate level of bandwidth and to provide sufficient number of routers that the physical distance over which requests have to be routed on the chip can be accommodated without significant loss of signal amplitude. For pairs of requesting and destination nodes which are expected to require a large amount of traffic then additional routers or signal channels can be provided between them, while other pairs of requesting/destination nodes may have less capacity.

The use of a network on chip is not essential and in other examples a different topology could be used within the system interconnect 6. For example, a series of point to point connections between the master and destination interfaces could be used, or a ring topology may be used in which all requests are asserted onto a ring bus and then circulate round until they reach the required target interface. Also, a mesh topology could be used where each interface 46, 48 is connected to a point on a grid and requests and responses may traverse between the points on the grid associated with the corresponding master and destination interfaces 46, 48. However, use of a network on chip can enable better scaling as the number of master and destinations increases.

Although FIG. 1 shows an example of a network for routing signals between master and slave devices within an integrated circuit, in other examples the devices connected by the interconnect may not have a master-slave relationship, but instead the devices could be connected by peer-to-peer connections. Also, in some examples some requests routed by the network may target a destination node within the interconnect itself, such as points of coherency or caches, rather than targeting a destination node outside the interconnect.

Figure 2:
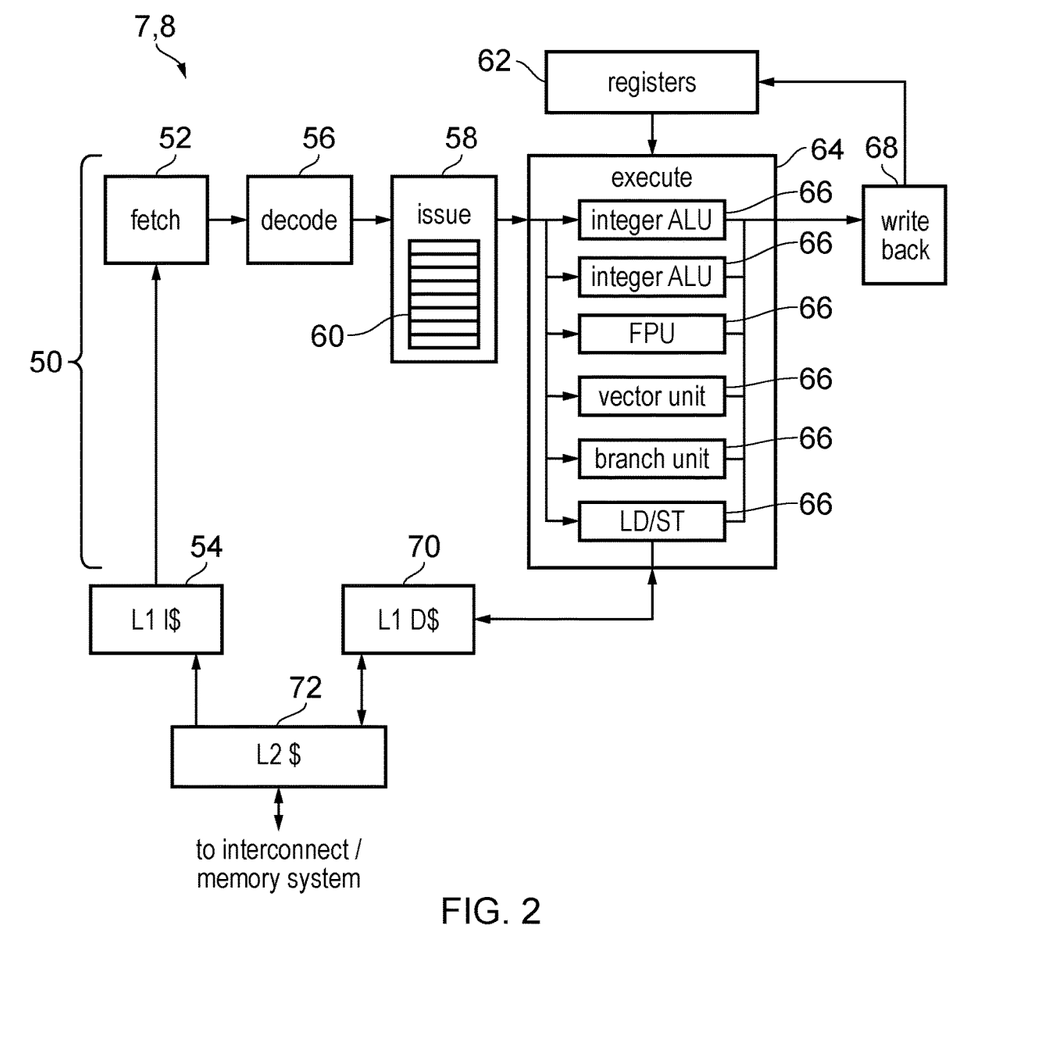
FIG. 2 illustrates an example of a processing element of the processing circuit.

FIG. 2 schematically illustrates a example of components within a processing element 7, 8 of the system on chip 2 which could for example be one of the CPU 7 or the GPU 8. The processing elements includes a processing pipeline 50 which includes a number of pipeline stages including a fetch stage 52 for fetching program instructions from an instruction cache 54, a decode stage 56 for decoding the fetched instructions, an issue stage 58 having an issue queue 60 for queuing decoded instructions and issuing the instructions for execution when their operands are available in registers 62, an execute stage 54 comprising a number of execution units 66 for executing data processing operations corresponding to the issued instructions using operands read from the registers 62, and a writeback stage 68 for writing back the results of the processing operations to the registers 62. It will be appreciated that this is just one example of a possible pipeline micro-architecture and other examples could have a different arrangement of stages. For example in an out of order processor a rename stage could be included to perform register renaming to remap architectural register specifiers specified by the program instructions to physical register specifiers identifying physical registers of the register file 62.

The execute stage 64 may have a number of different types of execution units 66 corresponding to different classes of instructions. For example, in FIG. 2 the execution units include two integer arithmetic/logic units (ALUs) for performing arithmetic or logical operations on integer operands, a floating point unit for performing operations involving floating point values, a vector unit for performing vector processing operations involving vector operands comprising multiple distinct data elements, a branch unit 66 for evaluating the outcome of branch instructions, and a load/store unit for executing load or store instructions for accessing a memory system. In this example the memory system comprises the level one instruction cache 54, a level one data cache 70, a shared level two cache 72 used for data and instructions, and the remainder of the memory system 26-38 accessible via the interconnect 4 as shown in FIG. 1.

An integrated circuit 2 of the type shown in FIG. 1 may include examples of many-to-many arbitration problems in a number of places within the computing system or the interconnection network. For example, as shown in FIG. 2, the execute stage 64 of a processing element may include multiple execution units 66 of the same type, for example two integer ALUs in the particular example of FIG. 2. The instructions queued in the issue queue 60 in a given cycle may include instructions which are capable of being executed on an of the integer ALUs. An M of N arbiter may be provided to select which of those instructions (up to a maximum of N instructions) should be executed on each of M integer ALUs.

Another example may be in the interconnect 4, 6, which may include a point at which multiple requesters are allocated bandwidth on multiple buses. For example, in the network on chip 6 shown in FIG. 1, some of the routers 44 may control access to multiple downstream buses and the router may in a given cycle receive more requests than can be allocated slots available on the buses in that cycle. Therefore, an arbiter may be provided to select up to M of the N requesters which can be allocated access to M resources on the buses. It will be appreciated that these are just some examples of possible scenarios in which such an arbiter can be provided.

Figure 3:
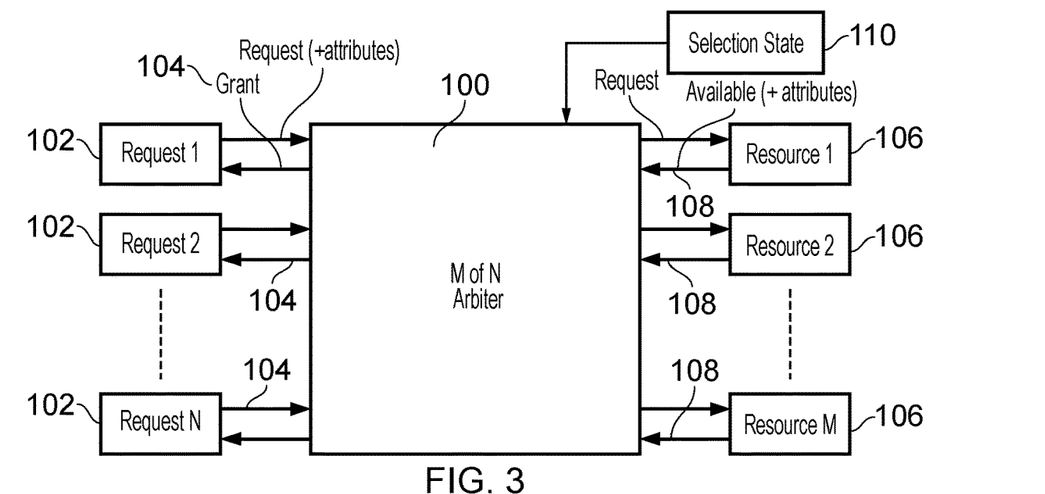
FIG. 3 shows an example of an M of N arbiter.

Hence, for a range of problems, it can be useful to provide an M of N arbiter which acts as a multi-resource arbiter which can grant M fungible resources to N requesters (clients) simultaneously. Fungible resources are resources which are mutually interchangeable so that it does not matter which particular resources are allocated to which particular requester. FIG. 3 shows an example of such an arbiter 100 which receives a number of requests from the N requesters 102, optionally with each request accompanied by certain attributes, and returns grant signals 104 indicating which of the requesters has been allocated access to one of M resources 106 in a given arbitration cycle. The arbitration decision may be dependent on a number of parameters, such as: enable indications indicating which of the N requesters 102 have actually made a request in a given arbitration cycle; attributes of the request, such as an indication of the request type; resource availability signals 108 indicating which of the M resources are available for being allocated a request in a given arbitration cycle; and selection state information 110 which indicates information about the requesters 102 which can be used to select between the requesters when multiple requesters are competing for access to a smaller number of resources. For example, the selection state information 110 could indicate a relative priority of each pair of requesters 102, or could for a given pair of requesters indicate which of those requesters has more recently been granted access to one of the resources, which can help with maintaining quality of service and reducing the chance that a particular requester may be starved of resource.

For an M of N arbiter 100 as shown in FIG. 3, a design difficulty is in ensuring that any requester is allocated to at most one resource. There are several approaches to this problem which have drawbacks as discussed with respect to FIGS. 4 and 5.

Figure 4:
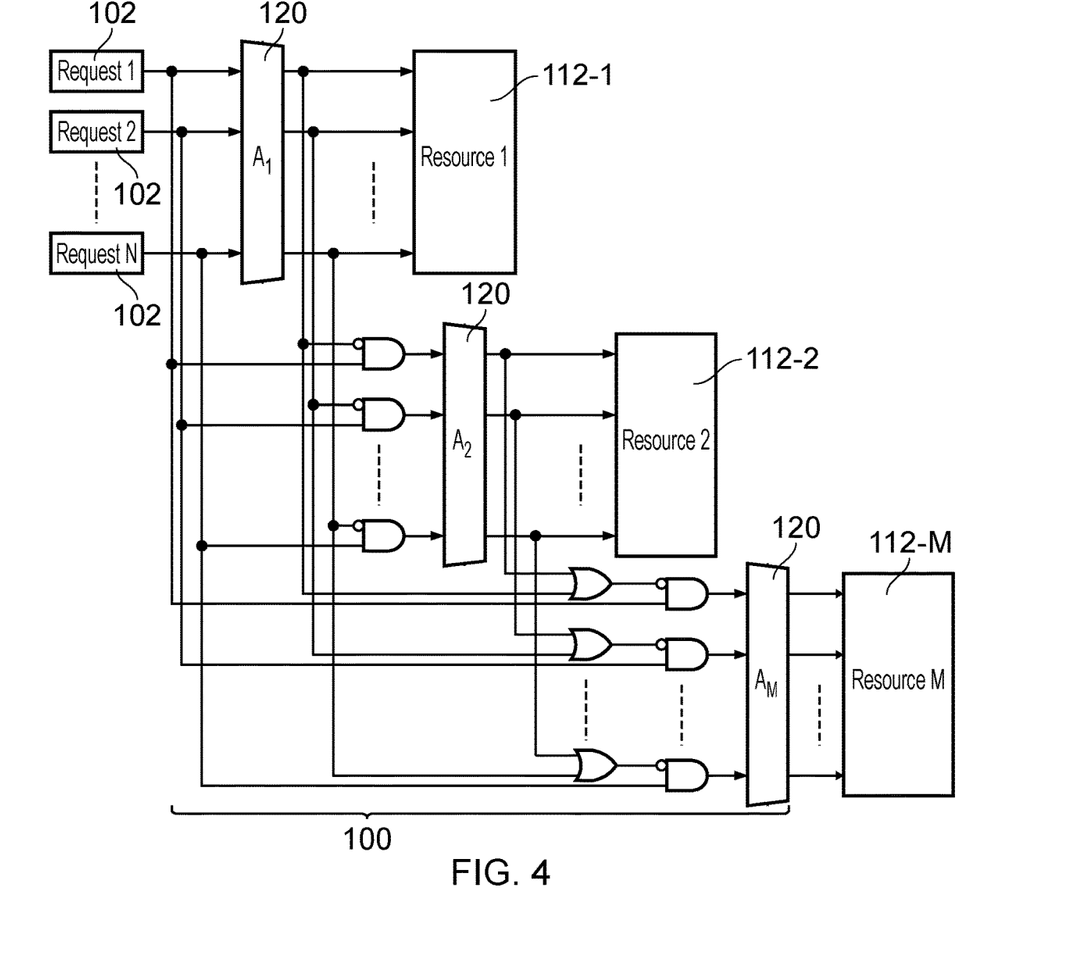
FIG. 4 shows a comparative example using cascaded arbiters to select which requesters to allocate to the M resources.

FIG. 4 shows an example where a serially-connected slave arbiter 112 is provided for each additional resource. The first arbiter 112-1 selects any of the N requesters for allocating to resource 1. The subsequent arbiters 112-2 to 112-M arbitrate only between those requests not already allocated to a higher-rank resource. This can provide a good overall service rate (as resources will be granted to the maximum possible number of enabled requesters in each cycle), but it is clear that the delay through, and circuit area of, the M of N arbiter 100 scales super-linearly with the number of resources M, so this is not a very desirable option in almost all cases.

Figure 5:
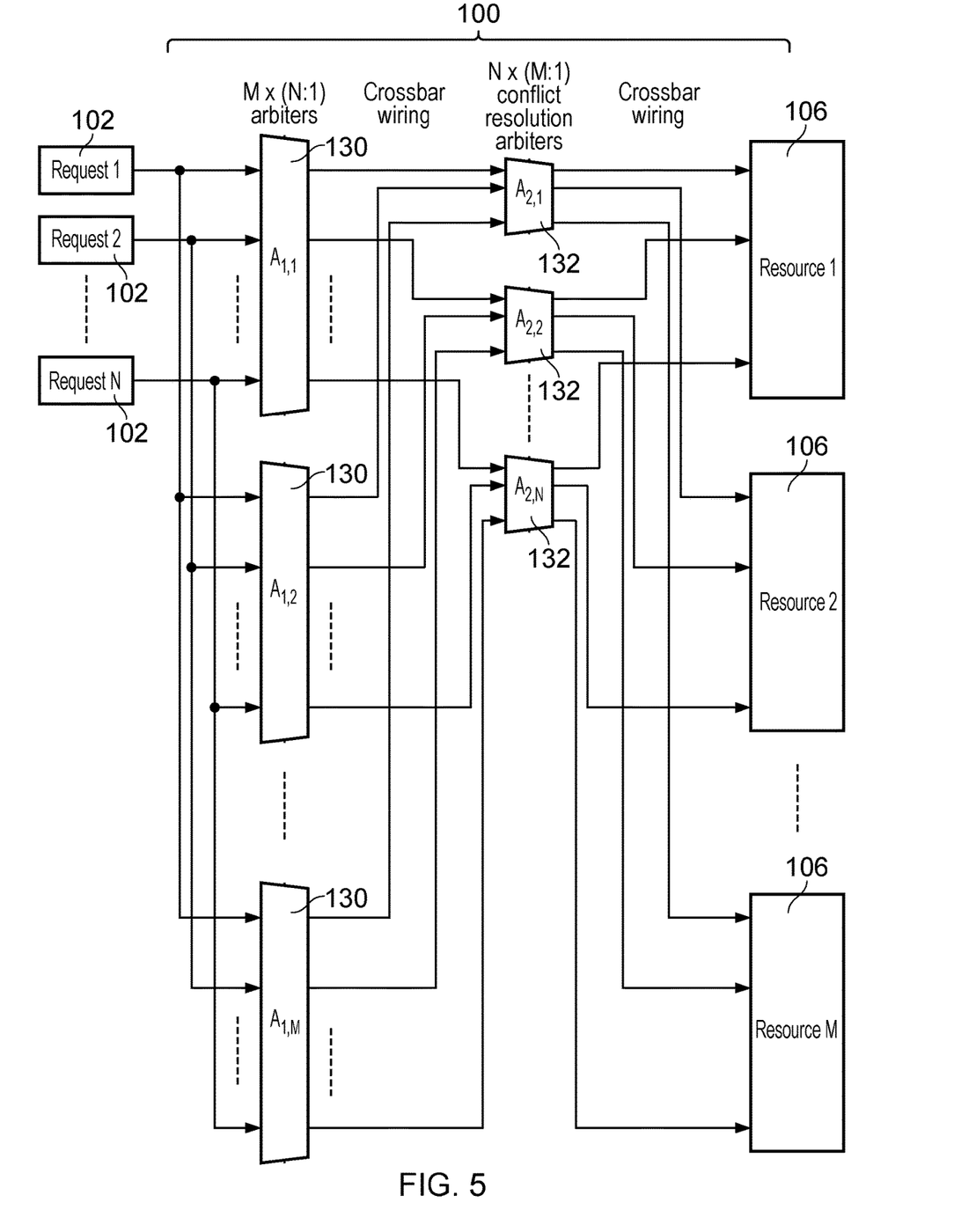
FIG. 5 shows a second comparative example using a conflict resolution stage to ensure that no requester can be allocated to more than one resource.

A more practical approach can be to add an extra arbitration stage 132 to remove conflicts in a main arbitration stage 130, as shown in FIG. 5. The delay through this circuit will only scale as approximately log 2(N)+log 2(M), which is better than in FIG. 4, but still significantly greater than that of a single N:1 arbiter. This approach requires M×(N:1) arbiters 130, each to select one requester from any of the N requesters, plus N×(M:1) arbiters 132, which ensure that when one requester is allocated to multiple resources, only one resource is allocated to the requester. Throughput is reduced compared to FIG. 4, because a winning grant from the first stage of arbiters 130 might be removed by the conflict resolution stage 132; there may have been a better choice that the first stage arbiter could have made but this option is not available retrospectively. Hence, in an arbitration cycle when multiple resources are allocated to the same requester by the first arbitration stage 130, some resources may remain unallocated for that cycle when otherwise they could have been allocated to a different requester. Also, in this arrangement, complex crossbar-like wiring is required, which is often undesirable because it can cause routing congestion, especially at small geometry implementations. In addition, special consideration is needed to ensure that starvation cannot occur due to a lockstep between the first and second stage arbiters. One way to achieve this is that, every time any arbiter chooses a request, it does not re-arbitrate until that request is granted a resource. This adds complexity (not shown in the diagram).

A hybrid of the schemes shown in FIGS. 4 and 5 can also be used.

Another approach can be to use resource classes to avoid the problem of ensuring that one requester cannot be allocated multiple resources. For example, the issue can be side-stepped by splitting the resources into mutually exclusive classes, for example by address (e.g. hashing or striping). This adds a decoder somewhere the path (which may not be critical) and changes the problem to one of crossbar allocation, for which an M of N arbiter is no longer required (in each class a simple N:1 arbiter can be used). However with a fixed class allocation, throughput is reduced to due to the head-of-line blocking phenomenon (slow service for the requester at the head of line blocks all other requesters in that class, even if those requesters could have been serviced by other resources). Also, the allocation of request to resources can exhibit some imbalance due to fluctuations in (or pathological distribution of) the class allocations. This, in practice, may mean bigger queues are required in each resource, which increases circuit area and power consumption.

Figure 6:
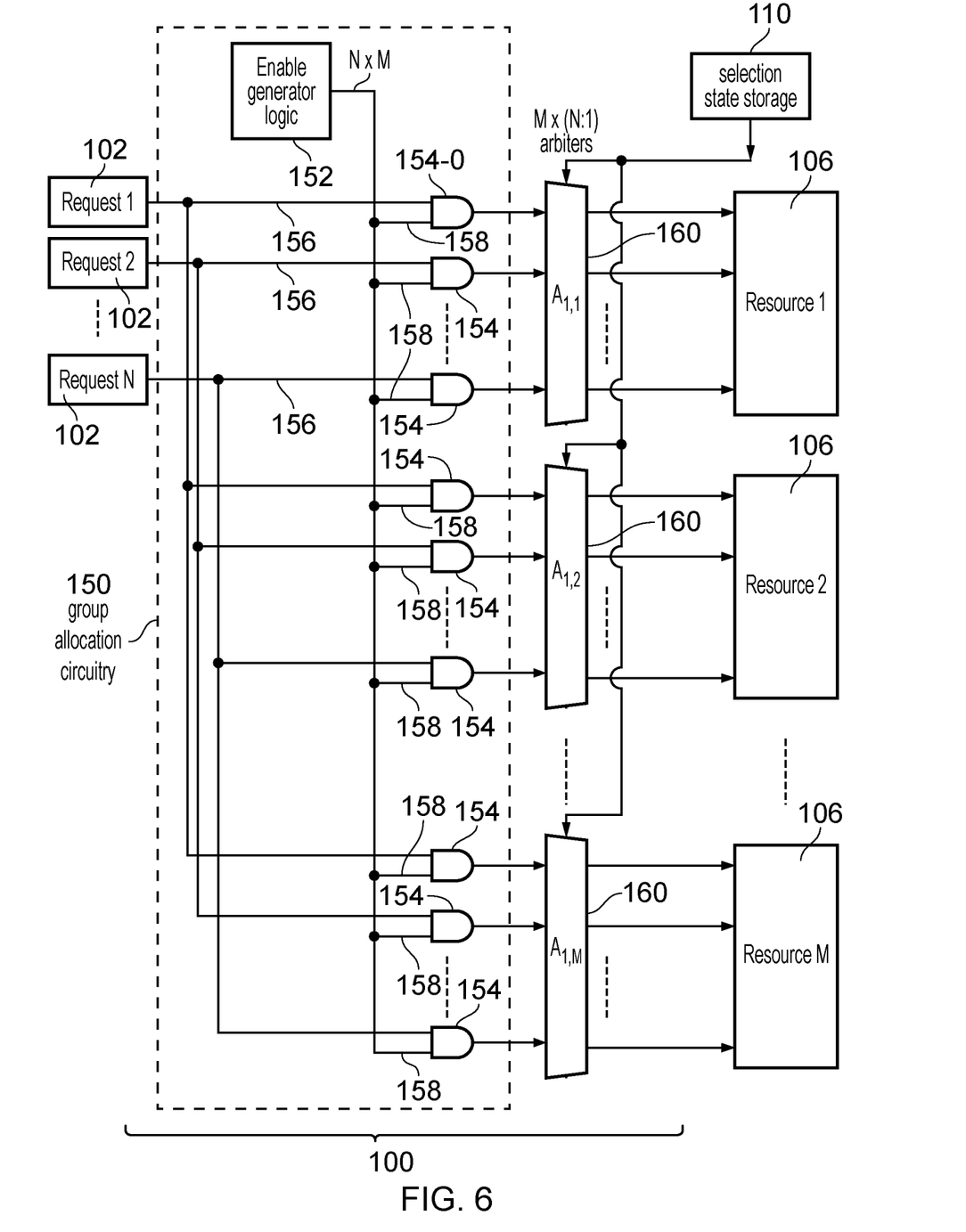
FIG. 6 shows arbitration circuitry comprising group allocation circuitry and M arbiters.

FIG. 6 shows a design of arbiter 100 for addressing these issues. The arbiter 100 includes group allocation circuitry 150 which allocates each of the N requesters 102 into one of M groups of requesters, each of the groups corresponding to one of the M resources 106. The group allocation circuitry 150 includes enable generation logic 152 and M×N AND gates 154. A set of N AND gates 154 is provided for each of the M resources, and the set of AND gates for a given resource includes one AND gate 154 per requester 102. Each of the AND gates 154 receives as its first input a request enable signal 156 indicating whether the corresponding requester is making a request in the current arbitration cycle. The second input of each AND gate receives a group enable signal 158 from the enable generation logic 152. The group enable signal 158 indicates whether the corresponding requester is a member of a group of requesters corresponding to the one of the resources 106 which corresponds to the relevant set of AND gates. For example, AND gate 154-0 shown in FIG. 6 receives the request enable signal 156 corresponding to requester 1 and the group enable signal 158 indicating whether requester 1 is part of the group corresponding to resource 1, and similarly other AND gates 154 are provided for each other pair of requester/resource. The enable generation logic 152 generates the group enable signals 158 so that each requester 102 is allocated to only one of the groups, i.e. of the subset of AND gates 154 which receive the request enable signals 156 corresponding to a particular requester, only one of the group enable inputs 158 to that subset of AND gates is 1 and all the other group enable inputs to that subset of AND gates are 0. This ensures that a requester can only be a member of one group at a time. The enable generation logic 152 will be discussed in more detail below.

The arbitration circuitry 100 also includes M arbiters 160, where each of the arbiters 160 corresponds to one of the resources 106 and selects a winning requester from among those requesters for which the corresponding AND gates 154 output an asserted signal, i.e. from among the requesters for which the requester is currently making an active request in the current arbitration cycle and for which the requester is a member of the group allocated to the corresponding resource. Each of the M arbiters 160 is implemented as an N:1 arbiter and so does not need conflict resolution logic to ensure that a given requester can not be allocated to more than one resource. Each of the M arbiters 160 may access the same shared selection state storage 110 which stores the selection state information used to arbitrate between different enabled requests. Hence, it is not necessary to provide M separate storage units for storing different subsets of selection state for different arbiters 160, as each request can only be enabled at one of the groups and so the arbiters for other groups for which a particular request is not a member will ignore the entries of the selection state 110 which apply to that requester.

The group membership changes each time a request is granted access to a resource. Hence, in response to a winning requester being granted a resource, the winning requester is switched to a different group.

Hence, in summary the arbitration circuitry 100 of FIG. 6 pre-allocates each of the requests into one of M groups, one for each of the resources. A simple N:1 arbiter for each of the resources chooses between the requests in the corresponding group. Because group of requests can access one only resource, the requirement that the arbiter never allocates the same request to more than one resource is satisfied. Effectively, the invention achieves output conflict resolution one cycle in advance, thus removing the need for any second arbiter on the critical path.

After a request wins arbitration, that request is changed (fairly) to be a member of a different group, i.e. targets a different (equivalent) resource, assuming one is available. This causes the pre-allocation logic to get into a beneficial de-synchronisation and thereby gives good throughput. It also provides fairness to the arbiter without the need for complex anti-starvation logic.

The decision path, i.e. the path from requests to grants, is the most critical. The only extra logic requited on the critical path in addition to that needed for a simple N:1 arbiter is one AND gate 158. In many situations this is, in any case, already present because there can be a requirement to qualify the requests (for example, in cases where the arbiter needs to be 'sticky'—that is retain a grant until a corresponding acknowledgement is received from the resource.). No complex crossing wiring is required on the critical path, unlike the approaches described earlier. Even if the enable generator logic 152 uses more complex logic, this is off the critical path as it acts in one arbitration cycle to control the conflict resolution in a subsequent cycle.

Figure 7:
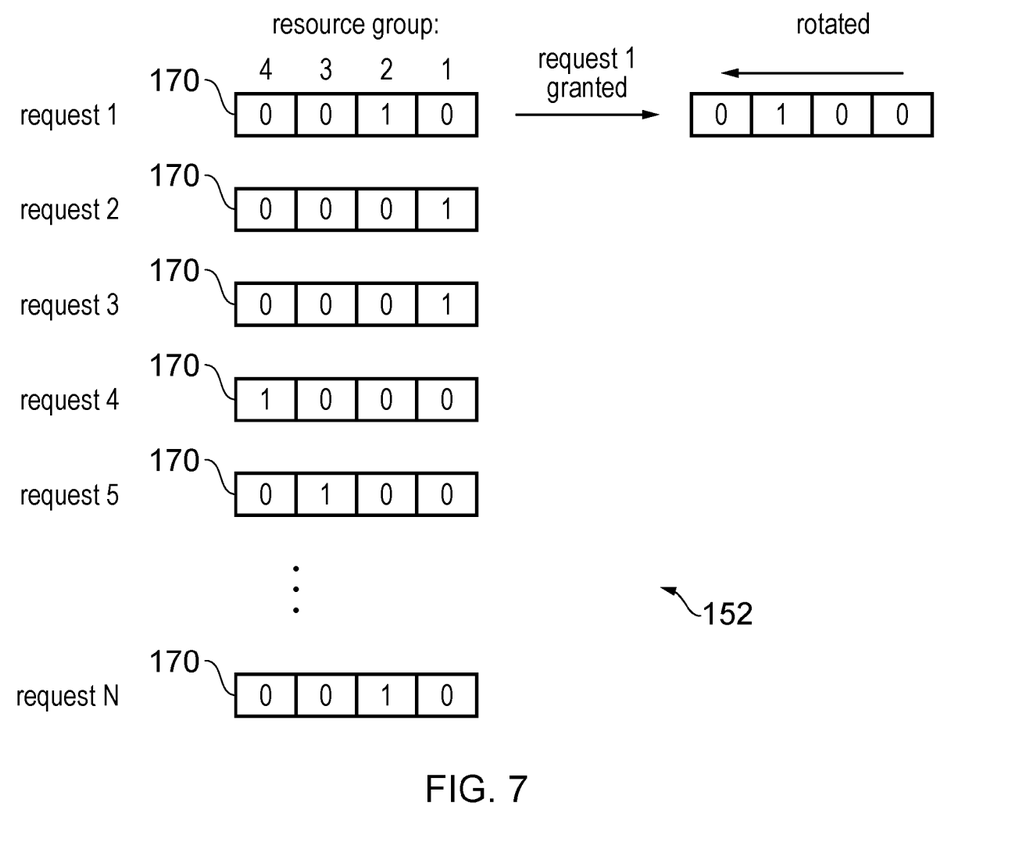
FIG. 7 shows an example of using N counters implemented as one-hot shift registers to control the group allocation.

FIG. 7 shows an example of a portion of the enable generation logic 152, which comprises N counters 170, each counter corresponding to one of the requesters 102. Each counter cycles through a sequence of M different values, where each value in the sequence corresponds to a respective one of the groups of requesters corresponding to a given one of the resources 106. On a reset of the system, the counters 170 are initialised so that different requesters have different values for the counter. In each arbitration cycle, the value of each counter 170 is decoded and if that decoded value matches the value for a particular resource, then the corresponding AND gate 154 enabling that request from the one of M inputs to the indicated output is set. The counters do not need to linearly increment, but may just step through each possible value fairly. For example a fast counting structure such as a linear feedback shift register can be used.

In the particular example of FIG. 7, each of the counters 170 is a one-hot shift register which includes a number of bits, only one of which is 1 in a given cycle and all the other bits are 0. In the example of FIG. 7, for conciseness four resources are available for arbitration and so each shift register includes four bits. The position of the '1' bit within the register indicates the group the corresponding requester is allocated to. In the example shown in FIG. 7, requesters 1 and N are currently allocated to group 2, requesters 2 and 3 are allocated to group 1, requester 4 is allocated to group 4 and requester 5 is allocated to group 3.

When a particular requester (e.g. requester 1) is granted access to a resource, then its counter 170 is updated to switch to the next value in its sequence of different values. For example in the implementation shown in FIG. 7 the one hot shift register is rotated left by one bit position so as to indicate that for a subsequent arbitration cycle request 1 will now be in group 3 instead of group 2. By changing the group membership over time then this provides fairness in arbitration without the need for a complex antique starvation logic. While FIG. 7 shows one requester changing groups, in cycles when multiple requesters are granted access to resources, then each of the winning requesters may switch groups for the next arbitration cycle.

Figure 8:
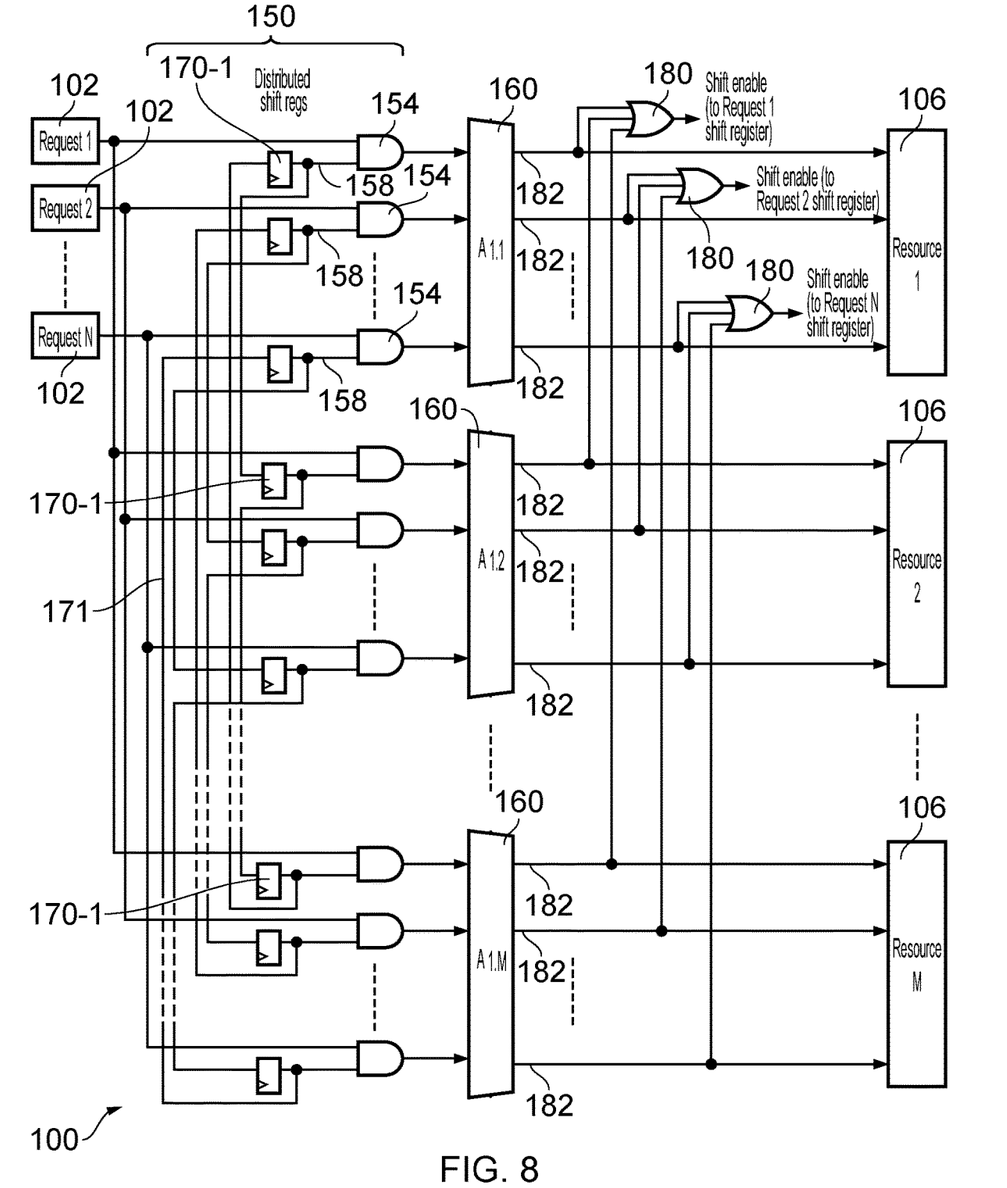
FIG. 8 shows an example in which the bits of each one-hot shift register are distributed among the arbiters.

FIG. 8 shows an example of the enable generation logic 152 in more detail, in which the 1-hot shift registers 170 are implemented as distributed shift registers which include a number of bits, with each bit associated with one of the resource arbiters 160 so that that bit is positioned locally on the integrated circuit near to the corresponding arbiter. For example the respective bits of the 1-hot shift register 170 corresponding to requester 1 are collectively labelled 170-1 in FIG. 8. It can be seen that each of the other requesters also has a corresponding set of distributed set of shift register bits positioned with one bit next to each of the arbiters 160. The outputs of the respective bits of each shift register are applied as the group enable signals 158 supplied to each AND gate 154 of the group allocation circuitry 150. Hence, this approach avoids complex wiring and provides the smallest possible delay from the counters 170 to the critical decision logic 160. A number of OR gates 180 are provided to OR together the grant signals 182 from each arbiter 160 which correspond to the same requester, so that when a given requester is allocated access to a resource by any of the arbiters, then the output of the corresponding OR gate 180 is asserted to trigger the corresponding shift register 170 to update its value and switch to the next value in the sequence. Each of the bits of the shift register output their current value to the next bit in the sequence in order to implement the rotation of the count value represented by the shift register.

FIG. 8 shows an example where the individual bits of a given shift register 170 are connected in a ring topology, where each bit has its output supplied to the next bit in the ring and then the final bit outputs its signal back to the first bit in the ring. However this may require a long wire 171 wrapping back to the first bit from the last bit of the shift register.

Figure 9:
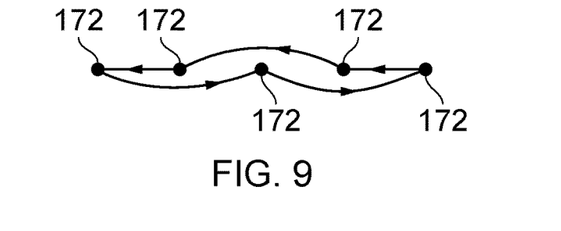
FIG. 9 schematically illustrates an example of a folded torus topology.

As shown in FIG. 9, such a long wire can be avoided by instead connecting the respective bits 172 of a given shift register in a folded torus topology. FIG. 9 shows an example where the shift register includes 5 bits. In a folded torus topology at least some nodes of the network are connected to a node other than its nearest neighbour so that effectively the network links skip over some nodes on a first pass, and the skipped out nodes are instead traversed on a reverse pass through the network. For example, in FIG. 9 nodes 1 3 and 5 are traversed on the path of the network passing from left to right and then nodes 2 and 4 are traversed on the reverse path from right to left. This approach can avoid needing a very long wire which wraps round from the last resource to the first resource.

FIG. 7 shows an example where the counters 170 are implemented as multi-bit counters for arbitrating for more than two resources. However, when N=2 then it is not necessary to provide a 2-bit counter as instead a single bit counter per request could be used, with the true and complement outputs of that single bit being used directly as the enable signals 158 indicating whether a requester is a member of the first group or the second group.

The basic scheme shown in FIGS. 7 and 8 may work well if each resource M is always available and can process a request without significant delay. However, in some systems a resource once granted to a particular requester may be occupied for several cycles and so in some arbitration cycles certain resources may be unavailable or busy. If this is the case, then the scheme shown in FIGS. 7 and 8 which simply moves a given requester to the next group in the sequence each time that requester is granted access to a resource may result in many of the requesters accumulating in the group corresponding to the busy or unavailable resource. This may not only be undesirable for throughput during the time when that resource is busy, but may also cause a delay in re-establishing the beneficial de-synchronisation which distributes the requesters among the respective groups once that resource has become available again.

This can be avoided by providing a scheme in which the enable generator logic 152 of the group allocation circuitry 150 controls a requester to skip at least one group in the sequence when a group corresponds to a busy resource. Hence, when a given requester is selected as the winning requester for granting access to a particular resource, then if the next resource in the sequence is currently busy, then that requester could skip the busy resource and be allocated to a subsequent group which corresponds to an available resource. Some systems may only be capable of skipping one resource in a sequence, while others could skip multiple resources. The circuit implementation may be simpler if enabled generation circuitry associated with a given output only needs to consider the available signal 108 for one adjacent output in the sequence in each cycle.

Figure 10:
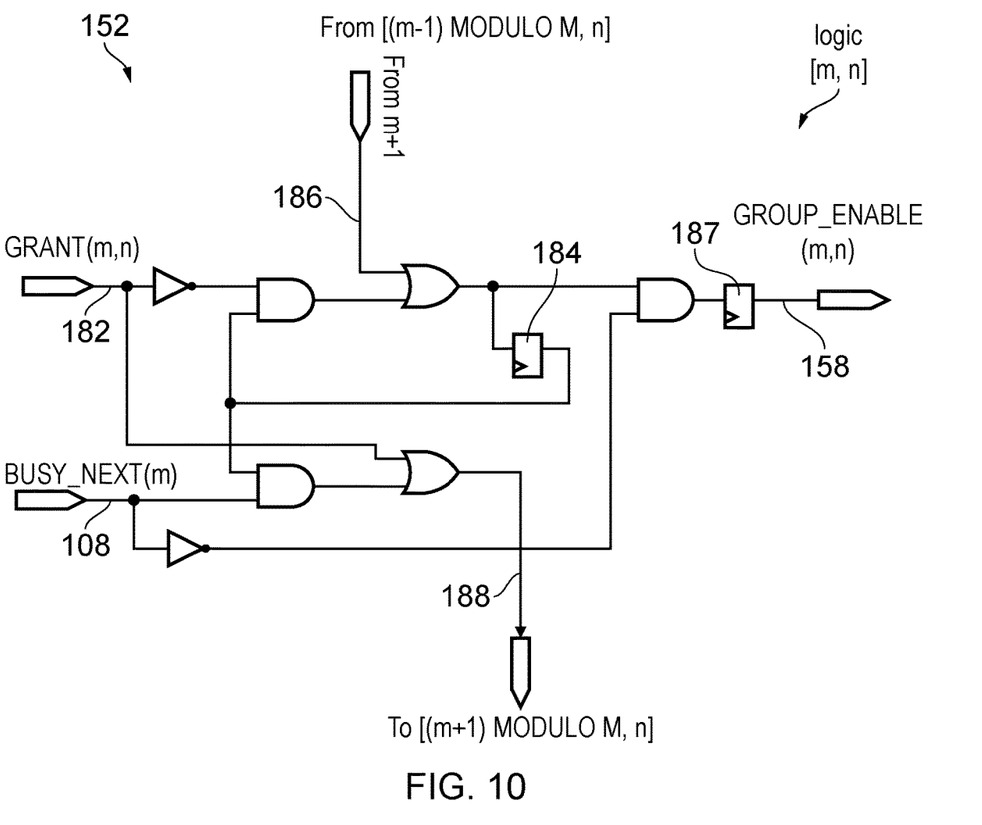
FIG. 10 shows an example of a portion of the group allocation circuitry for controlling a given requester to skip a group in the sequence when a corresponding resource is busy.

FIG. 10 illustrates an example of a portion of the enable generation logic 152 for skipping a group corresponding to a busy resource. The logic [m, n] shown in FIG. 10 would be provided once for each AND gate 154 as shown in FIG. 6 or 8, i.e. the logic of FIG. 10 applies to one stage n (i.e. for one requester) of the shift register for one resource m (where 1≤n≤N and 0≤m≤M−1). Note that in FIG. 10 the resources are labelled 0 to M−1 instead of 1 to M so that the expressions using modulo M evaluate correctly. It will be appreciated that resources 0 to M−1 in FIG. 10 correspond to resources 1 to M shown in other diagrams.

The enable generation logic 150 would comprise N×M of these circuits in total. The logic [m, n] shown in FIG. 10 generates the group enable signal 158 for the corresponding one of the N×M AND gates 154. The logic in FIG. 10 receives as input the grant signal 182 output by given arbiter 160 to indicate that requester n has been allocated access to resource m, and a busy signal 108 indicating whether resource m will be busy in the next arbitration cycle. The resource m busy signal 108 may be available a cycle in advance as it may be determined based on the arbitration in the previous cycle that the resource may be busy.

Register 184 stores the bit of the shift register 170 corresponding to requester n that indicates whether requester n is a member of the group of requesters corresponding to resource m. Effectively the contents of register 184 represents a 1-hot token which indicates whether requester n is in group m. The progress of this token through the respective bits of the shift register 170 (each bit being in a different one of the M×N instances of the logic [m,n] of FIG. 10) shifts each cycle when requester n is granted a resource or when a busy resource is skipped.

The logic [m, n] of FIG. 10 receives a signal 186 from the corresponding logic [(m−1)modulo M, n] for controlling access by requester n to a previous resource in the sequence (note that for resource 0, the previous resource will be resource M−1). When asserted, signal 186 indicates that the requester n has been shifted to the next resource in the sequence (either because the resource was busy or because the requester was granted access to resource (m−1) modulo M). The logic [m, n] of FIG. 10 also outputs a signal 188 to the corresponding logic [(m+1) modulo M, n] for the next group in the sequence. Note that for resource M−1, the next resource will be resource 0. Signal 188, when asserted, indicates that requester n should be switched to the next group in the sequence. Signal 188 in one stage [m, n] of the logic becomes the signal 186 supplied to the next stage of the logic [(m+1) modulo M, n].

Hence, when the token is present at the stage in the logic corresponding to resource m, and there is no grant in the current cycle, then the token remains asserted in the first register 184 (a "hold" term). When the previous resource (m−1) modulo M is either granted to request n or has the token but the previous resource is busy, then signal 186 indicates that stage m should receive the token for the next cycle and so this results in register 184 being set. If register 184 has the token and either the grant signal 182 is asserted to indicate that requester n has been granted access to resource m, or the busy signal 108 is asserted to indicate that resource m is busy, then this results in the output signal 188 being asserted to trigger transition of the token to the next stage [(m+1)modulo M, n] of the logic, and the register 184 is cleared. A second register 187 is provided to prevent the group enable signal 158 being set if the resource 108 is currently busy. If this is not an essential function then the second register 187 could be omitted and the group enable signal 158 could be driven directly from the first register 184 representing the bit of the shift register 170 for the resource m and requester n.

The equivalent function could alternatively be implemented with logic driving the enable input of the register 184 rather than the D input. Also, clock enable terms could be added to save power by preventing the token from shifting when unnecessary (e.g. all busy or no requests).

An alternative approach would be to use the token registers 170 of FIG. 8 and all inputs to form a logic tree with depth approximately 2(M)−1 to perform skipping of multiple busy resources in the same cycle.

Hence, there are a number of ways in which a given requester could skip at least one group in the sequence so as to bypass groups corresponding to currently busy resources.

A further option may be to provide different sequences of groups for different requesters. For example each of the counters 170 or shift registers could be hashed based on a requester identifier corresponding to a particular requester, so as to result in different counters cycling through the sequence of count values in a different order compared to other requesters. In implementations which allow skipping of busy resources, this can help to reduce the probability that many requesters end up being allocated to the next group in the sequence after the group corresponding to the busy resource, since the different orders of the group sequence for the different requesters will then switch the requesters to different groups when they bypass the busy resources. Alternatively, rather than hashing the counters, another implementation may provide wiring which connects the respective bits 170 of each shift register so that the bits are connected in different sequences for different requesters.

Figure 11:
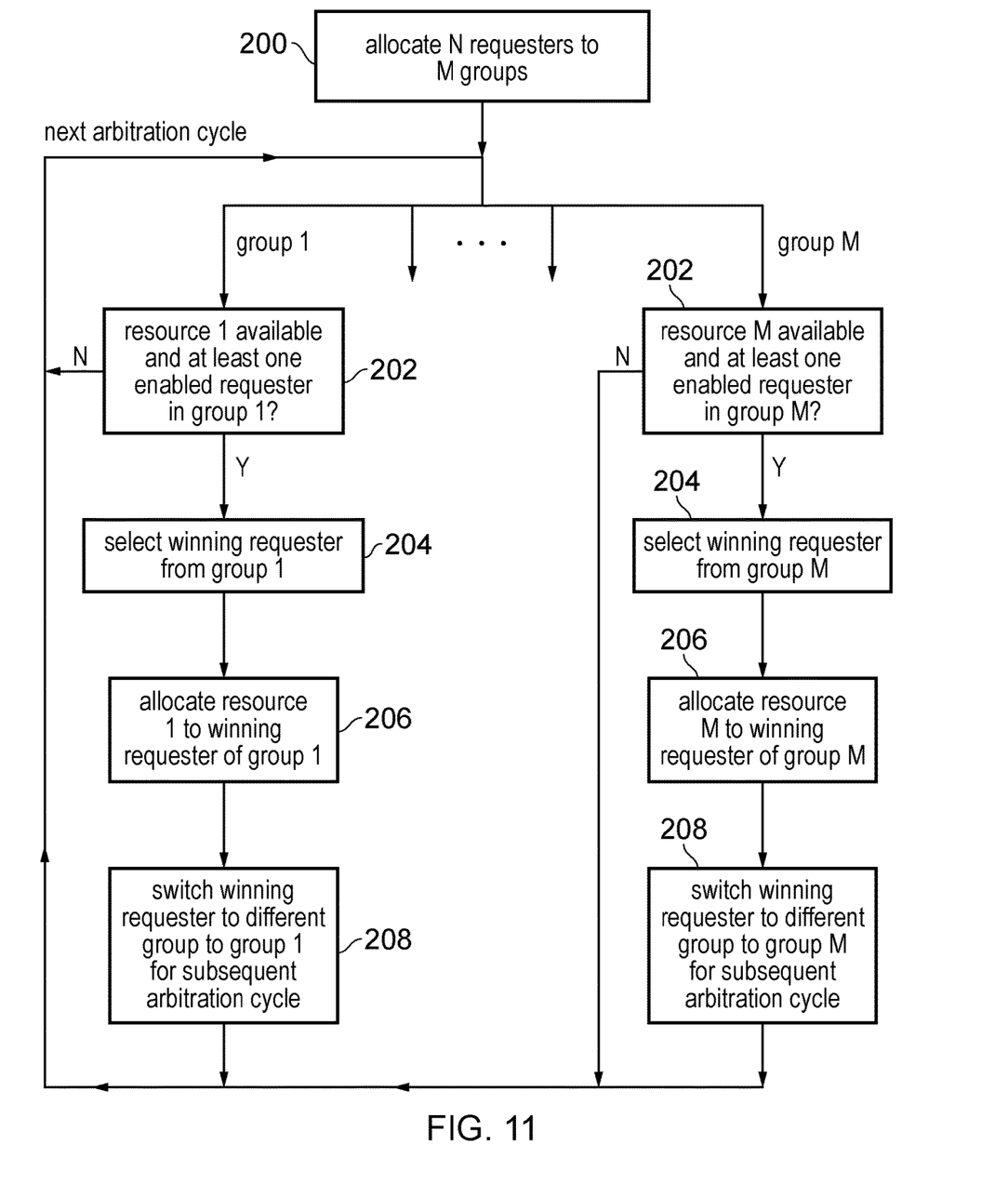
FIG. 11 is a flow diagram showing a method of performing arbitration.

FIG. 11 is a flow diagram showing a method of performing arbitration between a maximum of N requesters seeking access to a maximum of M resources. At step 200 the group allocation circuitry 150 allocates the N requesters to M groups of requesters, each group corresponding to one of the resources and a given requester being allocated to only one of the groups. The group allocation may aim to distribute the requests among the groups where possible to increase the chances that multiple requesters can be selected as the winning requester in a given arbitration cycle and hence improve throughput. Step 200 is performed at reset or initialisation of the system, rather than at each arbitration cycle. For example, in response to a reset or initialisation event, each group may be allocated at least one requester.

During each arbitration cycle, a set of steps 202 to 208 is performed for each of the M groups of requesters corresponding to the M resources. FIG. 11 shows the steps for groups 1 and group M but it will be appreciated that the same steps may be performed in parallel for each of the other groups in cases where m is greater than 2.

At step 202 the arbitration circuitry 100 determines whether the corresponding resource is available and at least one enabled requester is making a request and is a member of the corresponding group of requesters for that particular resource. If the resource corresponding to a given group m (where m is between 1 and M) is not available, or there are no enabled requesters in the group m corresponding to that resource, then no winning requester is selected during the current arbitration cycle for that particular resource m, and the method loops back ready for the next arbitration cycle.

If resource m is available at step 202 and there is at least one enabled requester in the group m corresponding to that resource, then at step 204 the corresponding one of the arbiters 160 selects a winning requester from among the enabled requesters in group m. this selection may be based on the common set of selection state information stored in the shared state storage 110 which is accessible by each of the M arbiters 160. At step 206 the corresponding arbiter 160 allocates resource m to the winning requester at step 204. At step 208 the winning requester is triggered to switch to a different group to group m for an arbitration in a subsequent arbitration cycle. For example the different group could be a next group in a sequence of groups cycled through by the corresponding requester, or could be a subsequent group in the sequence if the next group corresponds to a busy resource. The method loops back for the next arbitration cycle where the method proceeds to step 202 once more for each of the M groups corresponding the M resources.

In summary, the arbitration circuitry discussed above which allocates requests to individual groups corresponding to resources and switches the group allocation each time a requester is granted access, with that updated group allocation then applying the next arbitration cycle, is able to grant M fungible resources to N requesters simultaneously, without requiring a serial logic path through more than one arbiter. This improves performance.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Arbitration circuitry for allocating resources to requesters, where a maximum number of resources that can be allocated to requesters in a given arbitration cycle is M, a maximum number of requesters requesting allocation of a resource in the given arbitration cycle is N, and M≥2; the arbitration circuitry comprising:
group allocation circuitry to control a group allocation in which the N requesters are allocated to M groups of requesters, with each requester allocated to one of the groups;
M arbiters each corresponding to a respective one of the M groups, each arbiter to select one requester from the corresponding group as a winning requester to be allocated a corresponding resource of the M resources;
in which:
in response to a given requester being selected as the winning requester by the arbiter corresponding to a given group, the group allocation circuitry is configured to change the group allocation so that in a subsequent arbitration cycle the given requester is in a different group to the given group.

2. The arbitration circuitry according to claim 1, in which each arbiter comprises an N:1 arbiter configured to select the winning requester from among enabled request signals on N input lines to the arbiter, each input line corresponding to one of the N requesters.

3. The arbitration circuitry according to claim 2, in which for a given arbiter, the group allocation circuitry is configured to disable request signals on any of the N input lines corresponding to requesters not allocated to the group corresponding to the given arbiter.

4. The arbitration circuitry according to claim 1, in which in response to the given requester being selected as the winning requester, the group allocation circuitry is configured to change the group allocation to switch the given requester to a next group in a predetermined sequence of groups.

5. The arbitration circuitry according to claim 4, in which when a resource corresponding to the next group in the predetermined sequence is busy or is determined to be busy in a subsequent arbitration cycle, the group allocation circuitry is configured to skip the next group in the predetermined sequence and switch the given requester to a subsequent group in the predetermined sequence.

6. The arbitration circuitry according to claim 4, in which an order of the groups in the predetermined sequence is different for different requesters.

7. The arbitration circuitry according to claim 1, in which the group allocation circuitry comprises N counters each corresponding to one of the N requesters and configured to cycle through a sequence of M count values; and
the group allocation circuitry is configured to select the group allocated to the given requester based on a current count value of the counter corresponding to the given requester.

8. The arbitration circuitry according to claim 7, in which each counter comprises a one-hot shift register.

9. The arbitration circuitry according to claim 8, in which each one-hot shift register comprises a distributed shift register comprising a plurality of bits distributed among the M arbiters, each arbiter being associated with one bit from each of N one-hot shift registers corresponding to the N requesters.

10. The arbitration circuitry according to claim 9, in which the plurality of bits of a given distributed shift register are connected in a folded torus topology.

11. The arbitration circuitry according to claim 1, in which each of the M arbiters is configured to select the winning requester from among the corresponding group of requesters based on selection state information associated with the N requesters.

12. The arbitration circuitry according to claim 11, comprising a shared storage element to store the selection state information associated with the N requesters, each of the M arbiters configured to select the winning requester from among the corresponding group of requesters based on the selection state information stored in the shared storage element.

13. The arbitration circuitry according to claim 1, where N>M.

14. An integrated circuit comprising the arbitration circuitry according to claim 1.

15. The integrated circuit according to claim 14, in which the resources comprise a plurality of execution units capable of executing the same type of instruction; and
the requesters comprise instructions capable of being executed by any of said plurality of execution units.

16. The integrated circuit according to claim 14, in which the resources comprise a plurality of buses for routing signals across said integrated circuit, and the requesters comprise requests for bandwidth to be allocated on any of said plurality of buses.

17. Arbitration apparatus for allocating resources to requesters, where a maximum number of resources that can be allocated in a given arbitration cycle is M, a maximum number of requesters that can request allocation of a resource in the given arbitration cycle is N, and M≥2; the arbitration circuitry comprising:
- means for controlling a group allocation in which the N requesters are allocated to M groups of requesters, with each requester allocated to one of the groups;
- M means for arbitration each corresponding to a respective one of the M groups, each means for arbitration to select one requester from the corresponding group as a winning requester to be allocated a corresponding resource of the M resources; in which:
- in response to a given requester being selected as the winning requester by the arbiter corresponding to a given group, the means for controlling is configured to change the group allocation so that in a subsequent arbitration cycle the given requester is in a different group to the given group.

18. An arbitration method for allocating resources to requesters, where a maximum number of resources that can be allocated in a given arbitration cycle is M, a maximum number of requesters that can request allocation of a resource in the given arbitration cycle is N, and M≥2;
the method comprising:
- allocating N requesters to M groups of requesters, with each requester allocated to one of the groups;
- performing arbitration using M arbiters each corresponding to a respective one of the M groups, each arbiter to select one requester from the corresponding group as a winning requester to be allocated a corresponding resource of the M resources; and
- in response to a given requester being selected as the winning requester by the arbiter corresponding to a given group, changing the group allocation so that in a subsequent arbitration cycle the given requester is in a different group to the given group.

* * * * *